United States Patent [19]
Conrad

[11] Patent Number: 5,664,819
[45] Date of Patent: Sep. 9, 1997

[54] WEED PULLING DEVICE

[76] Inventor: Lucas Jones Conrad, 5240 Lukon La., Winston-Salem, N.C. 27104

[21] Appl. No.: 718,188

[22] Filed: Sep. 19, 1996

[51] Int. Cl.$^6$ .................................................. A01B 1/16
[52] U.S. Cl. ........................... 294/50.6; 294/59; 7/114; 172/375
[58] Field of Search .................... 294/49, 50.6, 50.7, 294/51, 59, 19.1, 24; 172/371, 375, 378, 380, 381; 254/132; 7/114; 111/101, 106

[56] References Cited

U.S. PATENT DOCUMENTS

| | | | |
|---|---|---|---|
| 809,476 | 1/1906 | Thayer. | |
| 840,903 | 1/1907 | Bucknall. | |
| 1,178,015 | 4/1916 | Holmden. | |
| 1,672,095 | 6/1928 | Schacht. | |
| 1,867,086 | 7/1932 | Meixell | 294/50.6 |
| 2,860,001 | 11/1958 | Garland | 294/50.6 |
| 3,443,830 | 5/1969 | Jones | 294/50.7 |
| 5,244,241 | 9/1993 | Chih-chiang | 294/50.6 |

Primary Examiner—Dean Kramer
Attorney, Agent, or Firm—Herbert J. Bluhm

[57] ABSTRACT

A weed pulling device designed to apply a substantially vertical force to the stem of a weed engaged by the device comprises a tubular body having a first end that is bifurcated to provide two opposing members having edges that define two cooperating V-shaped slots or openings positioned in confronting relationship. One of the V-shaped slots or openings is designed to engage and retain the stem of a weed while the second V-shaped slot or opening is designed to contact the stem of the weed in a non-cutting manner as the device is manipulated to cause the weed stem to wrap around the bifurcated end of the tubular body. Also disclosed is a modification that additionally includes an elongated tine offset from an associated collar that is mounted on the side of the tubular body to provide sufficient space between the elongated tine and the tubular body to engage the stem of a weed in that space preparatory to wrapping the weed stem around the device by rotating it so that a pulling force can be applied to the stem of the weed.

19 Claims, 4 Drawing Sheets

WEED PULLING DEVICE

FIELD OF THE INVENTION

This invention relates to a device that is designed to remove weeds or other unwanted plants from the soil.

BACKGROUND OF THE INVENTION

The removal of weeds from various landscape settings is an ever present task for homeowners, gardeners, landscape specialists, farmers and others. By the term "weeds" is meant any plant that is regarded as an unwanted plant in a given location. Thus, a tomato plant growing in an ornamental flower bed would be regarded as a weed.

Many tools and techniques have been developed to deal with weed problems and one grouping to which the present invention relates is directed to a weeding implement attached to an elongated shaft or handle which permits a user to remove weeds from the soil while the user remains in a more or less standing position. While this grouping in its broadest aspects would include familiar tools such as hoes and spades, the devices contemplated in connected with this invention are those which seek to minimize disruption of the soil around the weed. The ultimate goal of weed removal devices is to duplicate the pulling of weeds by hand.

A weed puller which is designed to engage the stem of a weed for removing the weed from the soil is disclosed in U.S. Pat. No. 3,443,830. The device includes a bifurcated cylindrical collar with opposing legs that are provided with cutting edges and hook means. The opposing legs are capable of being pushed into the soil a short distance and twisted so that an engaged weed will be cut off at ground level or it may be hooked and pulled out. The serrated edge associated with one of the opposing legs makes it unlikely that an engaged weed would simply by pulled from the ground. Rathers, the more likely outcome is that an engaged weed will have its stem cut off which in many cases allows the weed to put out new growth because a major portion of its roof system remains intact.

U.S. Pat. No. 5,244,241 describes a weeding implement which seeks to minimize disruption of the soil around the weed that is extracted by the implement. The device includes a handle and attached shaft which terminates in a bifurcated structure that provided two stick members that are arranged in a spaced, cooperating fashion. The bottom of one of the stick members has a hook that is described to engage the main root of a weed and the weed is pulled up by the hook or the implement is rotated to wrap the main root around the bifurcated structure so that more force can be applied to pull up the engaged weed. In order for the implement to engage a weed root, it must be inserted into the soil and it is evident that considerable disruption of the soil cannot be avoided.

SUMMARY OF THE INVENTION

The presently disclosed invention is directed to a weed removing or extracting device which applies a pulling force to the weed without any appreciable encroachment of the soil around the weed by the device. The weed engaging portion of the device is disposed at the end of an elongated shaft or tube so that a user of the device may operate the device from a standing position.

The weed extracting device of this invention comprises a tubular body having a first end provided with weed-engaging means adjacent thereto and an opposing second end adapted for manipulation by the hands of a user of the device. The first end of the tubular body is bifurcated to provide two opposing members having opposing first and second edges. The opposing first edges of the two opposing members define a first V-shaped slot or opening that is designed to engage the stem of a weed. The opposing second edges of the two opposing members define a second V-shaped slot or opening. The opposing second edges have associated therewith rounded structural elements designed for non-cutting contact with the stem of a weed engaged by the first V-shaped slot or opening.

A user of the device directs the weed-engaging end of the tubular body toward the targeted weed to position the stem of the weed within both the first and second V-shaped slots or openings with the second V-shaped slot or opening facing the root end of the weed. The user then manipulates the second end of the tubular body in such a way that the stem of the weed is wrapped around the first end of the tubular body and the first end of the tubular body is brought into contact with the soil or ground adjacent to the root of the weed. Continued manipulation of the device exerts sufficient force on the stem of the weed and its attached root system to remove the weed from the soil.

Another embodiment of the instant invention involves a modification of the above-described device which makes the device capable of removing weeds that are too large or too inaccessible to engage effectively in the V-shaped slots or openings disposed at the first end of the tubular body. This modification comprises an elongated tine and associated offset mounting element affixed to the side of the tubular body a predetermined distance from the first end of the tubular body. The pointed end of the tine is directed toward the first or weed-engaging end of the tubular body and the offset mounting element is designed to position the tine a sufficient distance from the outer surface of the tubular body to permit engagement of the stem of a weed between the tine and the tubular body. The longitudinal axis of the tine is substantially parallel with the outer surface of the tubular body and the pointed end of the tine is preferably located adjacent to the V-shaped slots or openings disposed at the first end of the tubular body.

It is a principal object of this invention to provide a weed extracting device that removes a weed from the soil without significant disruption of the soil by the device.

It is a further object of this invention to provide a weed extracting device that enables a user to stand more or less erect while manipulating the device in the weed removal operation.

It is still a further object of this invention to provide a weed pulling device that is relatively light in weight but still durable for its intended uses.

Yet another object of this invention is to provide a combination of weed-engaging means in a weed extraction device to increase the versatility of the device.

These and other objects will become clear from an inspection of the accompanying drawings and the description which follows.

DESCRIPTION OF THE PREFERRED EMBODIMENTS

The weed pulling devices of the present invention include weed-engaging means fabricated from metal or plastic tubular stock having sufficient wall thickness to provide a rigid tubular structure. Metal or plastic pipe having an outside diameter between 2 and 8 and centimeters and a wall thickness of about 2 to 6 millimeters may be used to form the wed pulling devices. However, the density of metals such as iron results in a device that is significantly heavier and more unwieldy to manipulate than a device formed from plastic material. This disadvantage can be somewhat overcome by forming the weed-engaging portion of the device from metal and attaching thereto a shaft or pipe with associated handle means formed of lighter weight material such as wood or plastic to reduce the total weight of the device. It is also possible to employ less dense metals such as aluminum for fabricating the weed-engaging portion of the device.

The length of the weed pulling devices of this invention is not critical but is largely determined by the height of the person using the device. It is preferred that the length of the device be sufficient to enable the user to stand in an upright position while manipulating the device. It may also be desirable to have some excess length in the device to reach weeds in a remote area of an ivy bed or the like having limited access for the user. For most purposes a total length of the device between 1 and 2 meters is usually sufficient to provide satisfactory results. That length would reflect a combination of a shaft with an attached weed-engaging tubular structure as well as a device comprising an elongated tubular body having one end of the tubular body modified to provide weed-engaging means.

It is particularly preferred that the weed pulling device of this invention be fabricated from rigid plastic materials because they are relatively light in weight, rust-proof and durable. A commercial product that has been found to be very suitable is schedule 40 polyvinyl chloride pipe having an outside diameter of approximately 5 centimeters and a wall thickness of about 4 millimeters. It is commonly referred to as PVC pipe and can be obtained from retail stores handling home building supplies. The pipe can be formed into other desired shapes by the application of heat and pressure using known techniques and it can also be cut to introduce slots or holes at desired locations. Other polymeric materials may also be employed for fabricating the presently disclosed weed pulling devices including certain polypropylenes or polybutylenes.

Figure 1:
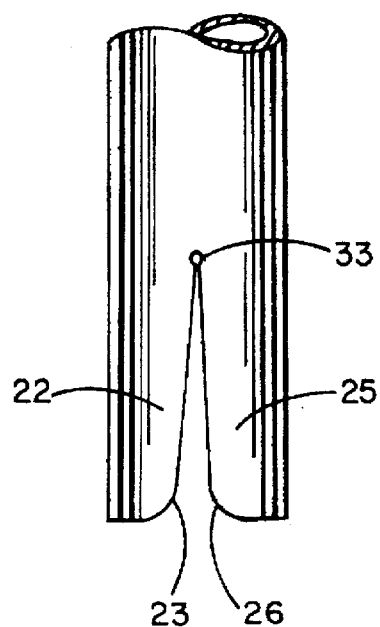
FIG. 1 is a side view of the weed-engaging portion of a weed pulling device in accordance with the present invention.
Figure 2:
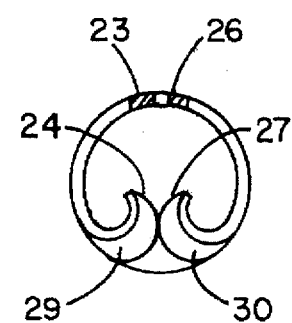
FIG. 2 is a bottom plan view looking at the lower end of the weed-engaging portion shown in FIG. 1.

Shown in FIGS. 1 and 2 are portions of a tubular body that have been modified to provide weed-engaging means. The tubular body is bifurcated to form opposing members 22 and 25 having opposing second edges 23 and 26 which define a first V-shaped slot openings. Opposing members 22 and 25 also having opposing second edges 24 and 27 (see FIG. 2) which define a second V-shaped slot or opening that is in confronting position to the first V-shaped slot or opening. The portions of opposing members 22 and 25 adjacent to opposing second edges 24 and 27 are shaped to provide rounded structural elements 29 and 30 associated therewith that are designed for contact with the stem of a weed engaged by the first V-shaped slot or opening the cooperation between the first and second V-shaped slots or openings is shown more clearly in the perspective view of FIG. 5. The weed pulling device is manipulated to bring the targeted weed stem 32 within the confines of the V-shaped openings with the second V-shaped opening and its associated rounded structural elements facing the root end of the weed. By forcing the stem of the weed into the narrower portion of the first V-shaped opening, edges 23 and 26 will serve to retain the stem as the device is rotated in either a clockwise or counterclockwise direction around the longitudinal axis of the tubular body with the assistance of handle 28. The rounded structural elements 29 and 30 protect against unwanted cutting or tearing of the stem as the device is rotated. It is preferred that the outer surface of opposing members 22 and 25 be scored or otherwise provided with a roughened, non-slip surface that is designed to reduce slippage of the weed stem as it is wrapped around the device. Continued rotation of the device exertes sufficient upward force on the weed stem to pull the root system of the weed from the soil. It will be noted that the pulling force applied to the weed involves a lever action in which the extreme end of the weed-engaging end of the device in contact with the surface of the ground or soil acts as the fulcrum and the weed stem represents the load located only a short distance from the fulcrum. This allows the device to be positioned so that the principal pulling force applied to the weed stem is in a substantially vertical direction.

Obviously, the effectiveness of the present weed pulling device depends on the ground or soil conditions in which the weeds are found. Weed roots are most susceptible to extraction from the soil when the soil is very moist. When the soil or ground is very dry, the stem of the weed is more likely to break off near ground level.

Figure 5:
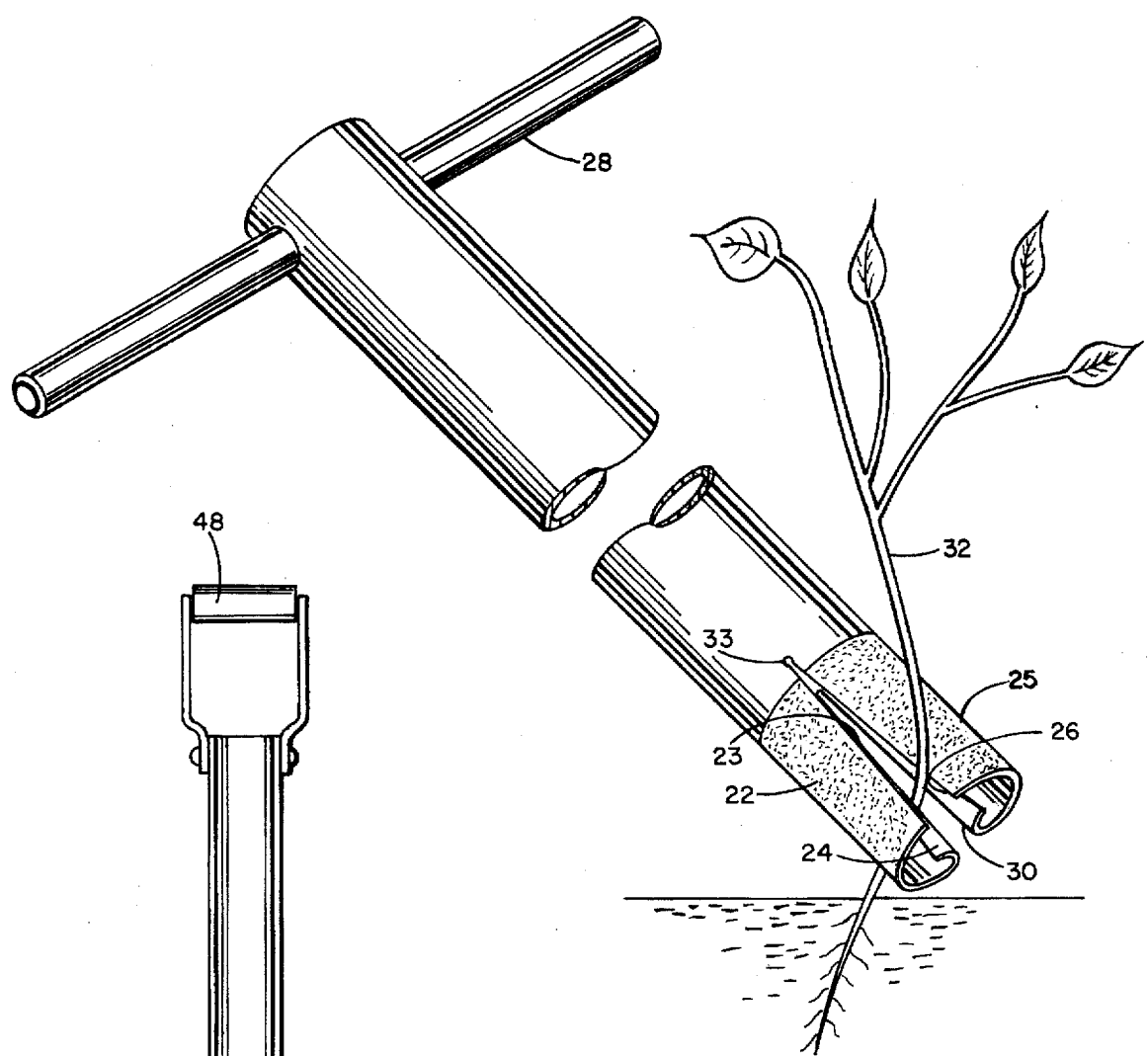
FIG. 5 is a perspective view of a weed extracting device which incorporates the weed-engaging structure shown in FIGS. 1 and 2.

When the device shown in FIG. 5 is fabricated from a material possessing some inherent resilience, the weed-engaging end of the device has a certain amount of flexibility introduced by the cooperating V-shaped slots or openings. As an engaged weed stem is subjected to the rotational movement of the device, the tension resulting from the stem being wrapped around the bifurcated end causes the opposing members 22 and 25 to move toward each other and thereby securing more tightly the stem that is held by the first V-shaped opening. Due to this slight movement of opposing members 22 and 25, it is desirable to introduce a small hole 33 at the apex of the second V-shaped opening.

Figure 3:
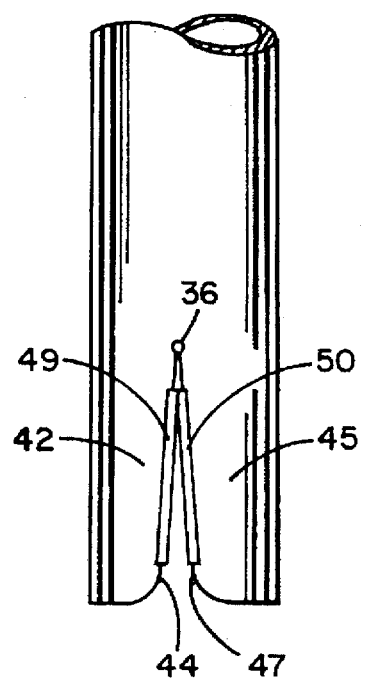
FIG. 3 is a side view of the weed-engaging portion of another embodiment of the present invention.
Figure 4:
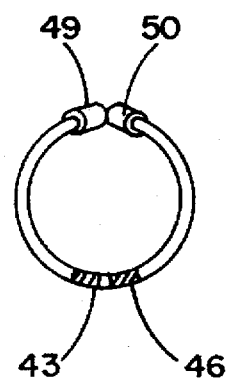
FIG. 4 is a bottom plan view looking at the lower end of the weed-engaging portion shown in FIG. 3.
Figure 6:
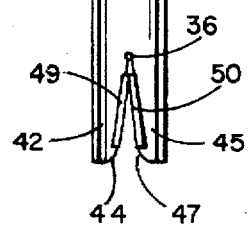
FIG. 6 is a side elevational view of a weed pulling device incorporating the embodiment shown in FIGS. 3 and 4.

Shown in FIGS. 3, 4 and 6 is another embodiment of the invention wherein the bifurcated end is formed with opposing members 42 and 45 having opposing first edges 43 and 46 (see FIG. 4) which define a first V-shaped slot or opening and opposing second edges 44 and 47 which define a second V-shaped slot or opening. Disposed on second edges 44 and 47 are lengths of tubing 49 and 50 which have been slit lengthwise and adhesively secured to edges 44 and 47 to present rounded surface areas designed for contact with the stem of a weed engaged by the first V-shaped slot or opening. A small hole 36 is preferably provided at the juncture of second edges 44 and 47 to relieve stress associated with slight movements of opposing members 42 and 45 when the stems of weeds are wrapped tightly around the bifurcated end of the device. Handle 48 is provided to facilitate manipulation of the device. Operation of a weed pulling device incorporating the embodiment shown in FIGS. 3, 4 and 6 is analogous to that described for the device shown in FIGS. 1, 2 and 5.

Figure 7:
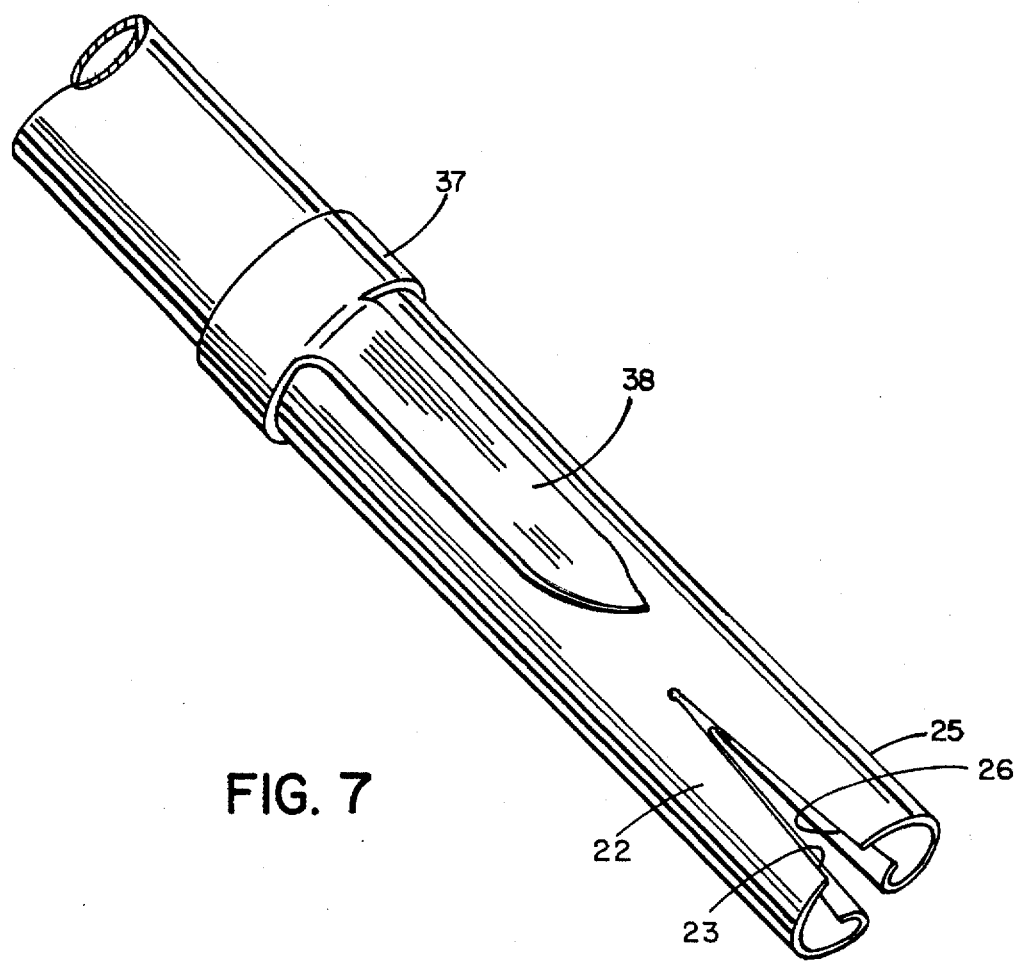
FIG. 7 is a perspective view of the weed-engaging portion of another embodiment of the present invention.
Figure 8:
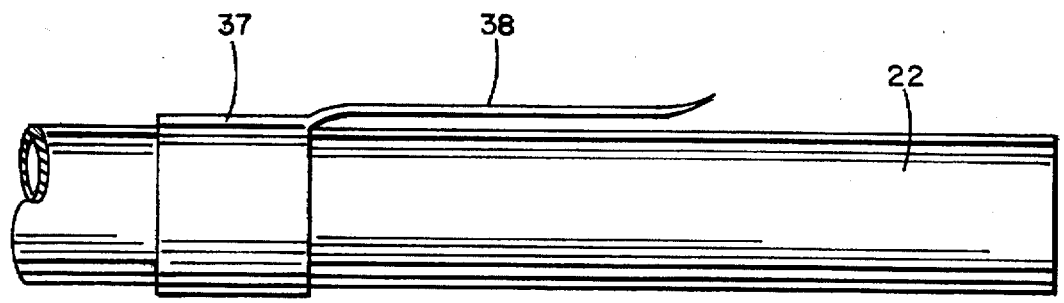
FIG. 8 is a side view of the embodiment shown in FIG. 7.

Some weeds are actually climbing vines which adhere to or coil around nearby objects such as tree trunks, fenceposts and the like. Such weeds are more difficult to engage using the embodiments shown in FIGS. 1 through 6. The device shown in FIGS. 7 and 8 is a modification of the embodiment shown in FIGS. 1, 2 and 5 and is capable of dealing with the removal of vines and larger plants such as small saplings. In this embodiment an elongated tine 38 with attached collar 37 is mounted on the side of the tubular body. Tine 38 is offset from collar 37 so that the stems of larger plants and vines can be introduced into the space between the tine and the outer surface of the tubular body. Collar 37 is affixed to the tubularly body by suitable adhesives or metal fasteners and is fabricated from metal or plastic material that is rigid but resilient. In order to avoid interference with the basic weed-engaging means disposed at the bifurcated end of the tubular body, the pointed end of tine 38 is located a short distance from the V-shaped slots or openings. The length of tine 38 is preferably between 10 and 20 centimeters and the major portion of the tine is spaced approximately 3 to 8 millimeters from the outer surface of the tubular body of the device. It is preferred that the pointed end of tine 38 be aligned with the first V-shaped slot or opening that is defined by opposing first edges 23 and 26. This will enable the user of the device to use tine 38 as a guide when manipulating the device to bring the stem of a weed into engagement with the first and second V-shaped slots or openings. It will be noted that the pointed end of tine 38 is curved away from the tubular body to facilitate entry of a weed stem into the space between the tine and the outer surface of the tubular body.

Figure 9:
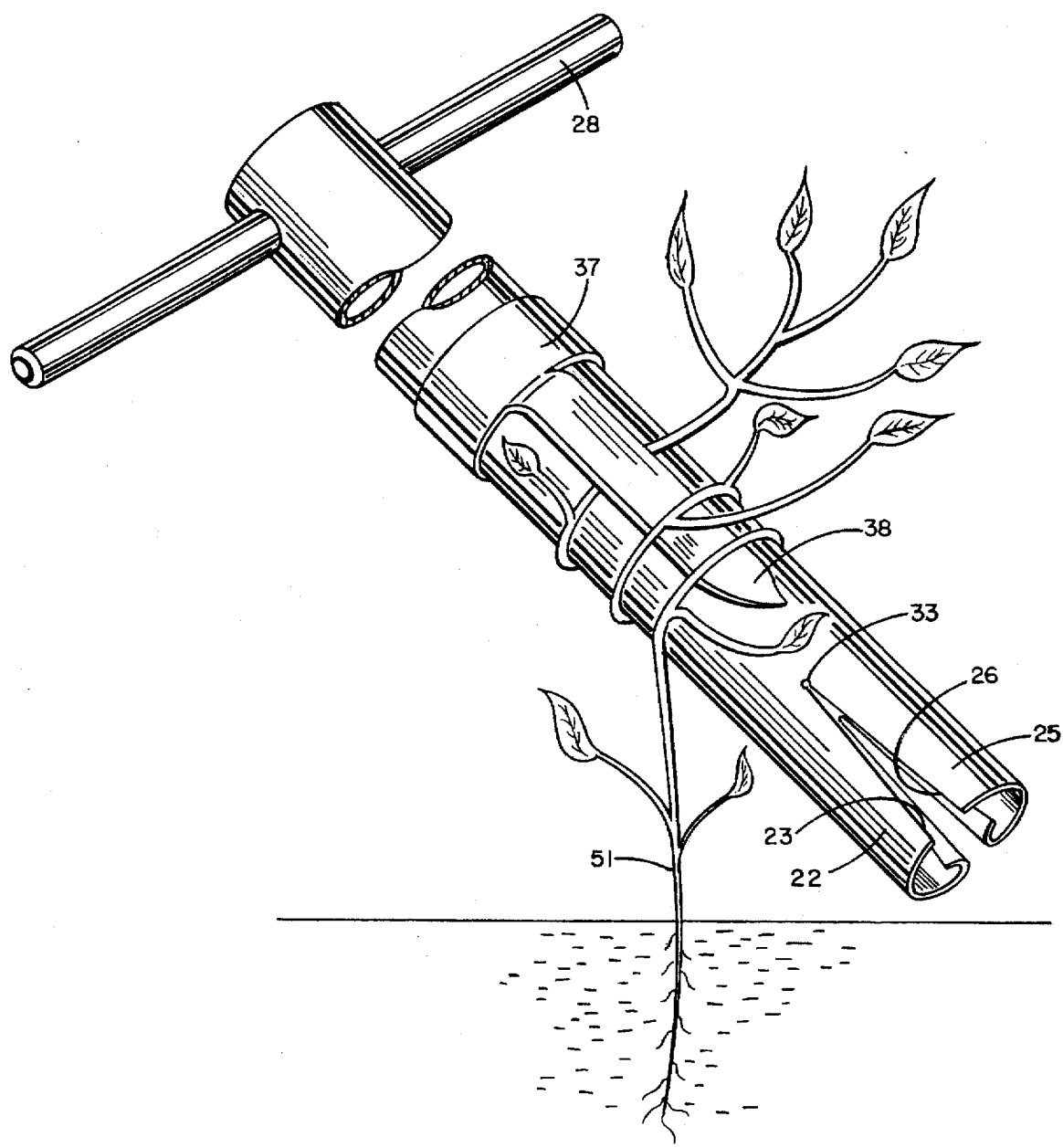
FIG. 9 is a perspective view of a weed extracting device which incorporates the weed-engaging structures shown in FIGS. 7 and 8.

Operation of the device shown in FIGS. 7 and 8 is depicted in the perspective view of FIG. 9. The stem of a weed or vine 51 is forced into the space between tine 38 and the tubular body. Rotation of the device in a counterclockwise direction (as viewed from the manipulating end) causes the stem to wrap around the tubular body and over tine 38. The inherent resilience of tine 38 allows it to be deflected by the stem overwrap and it simultaneously tightens the grip on the stem portion that is held between tine 38 and the tubular body. The outer surface of the tubular body in the area of tine 38 is preferably scored or otherwise provided with a roughened, non-slip surface that will help to prevent slippage of the weed stem as it is wrapped around the tine and tubular body. Continued rotation brings the weed-engaging end of the device into contact with the ground or soil and an upward force on the weed stem can be applied using the device's contact point with the ground as the fulcrum.

While several variations of the present invention have been described above, it is evident that other modifications are possible based on the teachings presented herein. All such modifications are considered to be a part of this invention as set forth in the appended claims.

What is claimed is:

1. A weed extracting device capable of being brought into engagement with the stem of a weed and being manipulated by a user of the device to cause the stem of the weed to be wrapped around the device so that sufficient pulling force can be applied to the weed to extract it from the soil, said weed extracting device comprising a tubular body having a first end provided with weed-engaging means adjacent thereto and an opposing second end adapted for manipulation by the hands of the user, said first end of the tubular body being bifurcated to provide two opposing members having opposing first edges and second edges, said opposing first edges defining a first V-shaped opening designed to engage the stem of a weed and said opposing second edges defining a second V-shaped opening in confronting position to the first V-shaped opening, said opposing second edges having associated therewith rounded structural elements designed for non-cutting contact with the stem of a weed engaged by the first V-shaped opening.

2. The weed extracting device of claim 1 wherein said tubular body is fabricated from a polymeric resin and is substantially cylindrical in shape with an outside diameter between 2 and 8 centimeters and a wall thickness between 2 and 6 millimeters.

3. The weed extracting device of claim 2 wherein said opposing second end of the tubular body adapted for manipulation by the hands of the user includes a handle designed to facilitate rotation of the tubular body around its longitudinal axis.

4. The weed extracting device of claim 3 wherein said tubular body is at least one meter in length.

5. The weed extracting device of claim 4 wherein the polymeric resin is polyvinyl chloride.

6. The weed extracting device of claim 5 wherein the outer surface of said opposing members on the bifurcated first end of the tubular body is provided with a non-slip surface that is designed to reduce slippage of the stem of an engaged weed as the stem is wrapped around the device during rotation of the device.

7. The weed extracting device of claim 1 wherein said weed-engaging means additionally includes an elongated tine and an associated offset mounting element affixed to the side of the tubular body a predetermined distance from said first end, said tine having a pointed end that is directed toward but spaced from said first end of the tubular body and said offset mounting element being designed to position the tine a sufficient distance from the outer surface of the tubular body to permit engagement of the stem of a weed between the tine and said tubular body.

8. The weed extracting device of claim 7 wherein said tubular body is fabricated from a polymeric resin and is substantially cylindrical in shape with an outside diameter between 2 and 8 centimeters and a wall thickness between 2 and 6 millimeters.

9. The weed extracting device of claim 8 wherein said opposing second end of the tubular body adapted for manipulation by the hands of the user includes a handle designed to facilitate rotation of the tubular body around its longitudinal axis.

10. The weed extracting device of claim 9 wherein said tubular body is at least one meter in length.

11. The weed extracting device of claim 10 wherein the polymeric resin is polyvinyl chloride.

12. The weed extracting device of claim 11 wherein the outer surface of said opposing members on the bifurcated first end of the tubular body is provided with a non-slip surface that is capable of reducing slippage of the stem of an engaged weed as the stem is wrapped around the device during rotation of the device.

13. A weed extracting device capable of being brought into engagement with the stem of a weed and being manipulated by a user of the device to cause the stem of the weed to be wrapped around the device so that sufficient pulling force can be applied to the weed to extract it from the soil, said weed extracting device comprising a tubular body having a first end provided with weed-engaging means adjacent thereto and an opposing second end adapted for manipulation by the hands of the user, said first end of the tubular body being bifurcated to provide two opposing members having opposing first edges and second edges, said opposing first edges defining a first V-shaped opening designed to engage the stem of a weed and said opposing second edges defining a second V-shaped opening in confronting position to the first V-shaped opening, said device being further characterized as having portions of said opposing members adjacent to said opposing second edges shaped to provide rounded structural elements designed for non-cutting contact with the stem of a weed engaged by the first V-shaped opening.

14. The weed extracting device of claim 13 wherein said weed-engaging means additionally includes an elongated tine and an associated offset mounting element affixed to the side of the tubular body a predetermined distance from said first end, said tine having a pointed end that is directed toward but spaced from said first end of the tubular body and said offset mounting element being designed to position the tine a sufficient distance from the outer surface of the tubular body to permit engagement of the stem of a weed between the tine and said tubular body.

15. The weed extracting device of claim 14 wherein said tubular body is fabricated from a polymeric resin and is substantially cylindrical in shape with an outside diameter between 2 and 8 centimeters and a wall thickness between 2 and 6 millimeters.

16. The weed extracting device of claim 15 wherein said opposing second end of the tubular body adapted for manipulation by the hands of the user includes a handle designed to facilitate rotation of the tubular body around its longitudinal axis.

17. The weed extracting device of claim 16 wherein said tubular body is at least one meter in length.

18. The weed extracting device of claim 17 wherein the polymeric resin is polyvinyl chloride.

19. The wed extracting device of claim 18 wherein the outer surface of said opposing members on the bifurcated first end of the tubular body is provided with a non-slip surface that is capable of reducing slippage of the stem of an engaged weed as the stem is wrapped around the device during rotation of the device.

* * * * *